United States Patent [19]

Vogel et al.

[11] 3,903,185

[45] Sept. 2, 1975

[54] MANUFACTURE OF ETHYLBENZENE

[75] Inventors: Hans-Henning Vogel; Hans-Martin Weitz, both of Frankenthal; Ernst Lorenz, Ludwigshafen; Rolf Platz, Mannheim, all of Germany

[73] Assignee: BASF Aktiengesellschaft, Ludwigshafen (Rhine), Germany

[22] Filed: Nov. 15, 1973

[21] Appl. No.: 416,259

[30] Foreign Application Priority Data
Nov. 17, 1972 Germany............................ 2256449

[52] U.S. Cl. ........................... 260/668 D; 260/673.5
[51] Int. Cl. .............................................. C07c 5/24
[58] Field of Search..................... 260/668 D, 673.5

[56] References Cited
UNITED STATES PATENTS
3,511,885  5/1970  Hughes .......................... 260/666 A
3,758,600  9/1973  Eberly et al. .................... 260/673.5

FOREIGN PATENTS OR APPLICATIONS
982,755  2/1965  United Kingdom
236,462  2/1967  U.S.S.R. .......................... 260/668 D
279,614  8/1970  U.S.S.R.

OTHER PUBLICATIONS

Chem. Abs., 74, 64040y, 1971, (Abstract of USSR Pat. No. 279,614, supra).

*Primary Examiner*—C. Davis
*Attorney, Agent, or Firm*—Johnston, Keil, Thompson & Shurtleff

[57] ABSTRACT

A method of manufacturing ethylbenzene in high yield by catalytic aromatization of the $C_8$-cycloolefins obtained in the dimerization of unsaturated $C_4$-hydrocarbons is described. By-products attributable to cracking, isomerization and decomposition of the raw material into its starting materials are virtually not detectable in the reaction product. The aromatization product can therefore be converted to styrene without prior distillation or purification.

10 Claims, 1 Drawing Figure

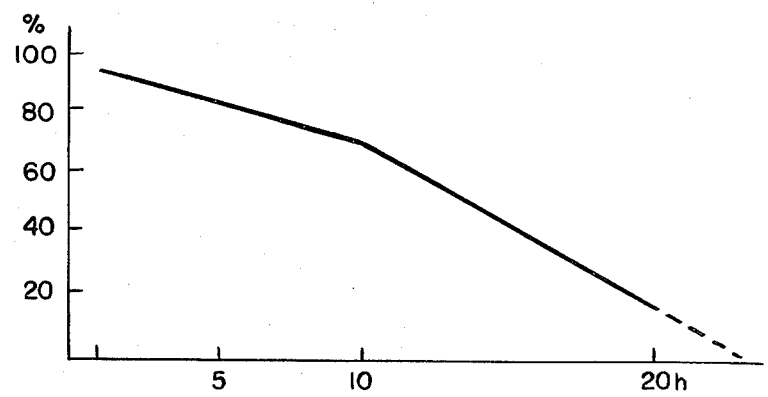

MANUFACTURE OF ETHYLBENZENE

The invention relates to a process for the manufacture of ethylbenzene by catalytic dehydrogenation of $C_8$-cycloolefins.

At the present time, the commercial manufacture of ethylbenzene is in the main carried out by alkylation of benzene with ethylene.

In the manufacture of basic chemicals such as ethylene or propylene, paraffin fractions are in the main used as starting materials. In the manufacture of the said basic chemicals by high temperature cracking of naphtha, aromatics are produced and are contained in by-products of the cracking reaction, for example pyrolysis gasoline. In spite of the progressive enlargement of manufacturing capacities for ethylene, a scarcity of aromatics must be expected in the future since the demand for aromatics is constantly rising.

Hence there is a need to manufacture aromatics also from other by-products of the manufacture of ethylene or propylene. Amongst the $C_4$-hydrocarbons produced, butadiene, above all, is available as a suitable raw material.

Various methods of manufacture of aromatics from butadiene have already been adopted.

Thus, for example, E.GIL-AV et al., J.Chem.Eng.Data, 5, Page 98, 1960, have described the direct thermal aromatization of butadiene. This process gives a mixture of aromatics containing, for example, benzene, toluene, ethylbenzene and xylenes. The separation of these aromatics by distillation involves heavy expenditure for equipment. The process permits the production of ethylbenzene from the $C_4$-hydrocarbons produced in the manufacture of ethylene, especially from vinylcyclohexene-1 and its isomers, in a single process step.

A further possible method of obtaining aromatics is the dimerization of butadiene to give 4-vinylcyclohexene-1. Styrene or mixtures of styrene and ethylbenzene can be obtained by catalytic dehydrogenation of 4-vinylcyclohexene.

U.S. Pat. No. 2,376,985 discloses the dimerization of butadiene and the subsequent conversion of the dimer in the presence of hydrogen and aromatization catalysts under atmospheric or superatmospheric pressure and at elevated temperatures (450° to 800°C), using short dwell times. This process however not only gives styrene but also, above all, higher-boiling and lower-boiling products; in addition, the conversion of the butadiene dimer is incomplete and the dimer can only be separated from styrene by involved extractive distillation or azeotropic distillation. A variant of the process makes it possible to obtain ethylbenzene, cyclohexane and styrene; in this case, further separations and catalytic process steps are needed to convert the undesired by-products into styrene.

U.S. Pat. No. 2,438,041 discloses a process in which mixtures of butadiene and 4-vinylcyclohexene-1 are passed over dehydrogenation catalysts at temperatures ranging from 400° to 600°C. The reaction product contains, inter alia, styrene (13.8% by weight), ethylbenzene (5.3% by weight), unreacted 4-vinylcyclohexene-1, butadiene, butene, butane, ethylene produced by cracking and small quantities of benzene.

V. I. Komarewsky et al. (see Chim. et Industrie, 70, 1,074 et seq. (1953)) convert vinylcyclohexene by means of dehydrogenation catalysts at temperatures between 400° and 550°C under atmospheric pressure in the presence of hydrogen or an inert carrier gas (nitrogen) and achieve total conversions of at most 75% based on the vinylcyclohexene employed. The reaction product contains ethylbenzene and styrene in addition to 25% of unconverted starting product. Two important disadvantages of this process are that the conversion achieved is only 75%, which entails carrying our expensive separating operations on the dehydrogenation product, and that the catalyst rapidly loses its activity since in processes carried out under normal pressure the catalyst activity declines after a short time due to carbon deposition.

FIG. 1 shows how, in the dehydrogenation of vinylcyclohexene under normal pressure at 400° to 450°C using a catalyst containing 10% of chromium (III) oxide on aluminum oxide (without the provision of additional hydrogen), the conversion of vinylcyclohexene declines from an initial value of 95% to less than 20% due to decreasing catalyst activity.

The conversion of vinylcyclohexene, in percent, is plotted as the ordinate and the time (in hours) is shown as the abscissa.

All the processes mentioned thus suffer from the disadvantage that in every case mixtures of ethylbenzene and styrene are produced and only partial conversions are achieved or, if the conversions are satisfactory, the life of the catalyst is short. Furthermore cracking and isomerization occur as side reactions at the high aromatization temperatures hitherto employed. Objectionable amounts of benzene, toluene and o-, m- and p-xylene are formed. Because of the differences in boiling points of the by-products formed in the cracking and isomerization reactions being slight (compare Table 1), it requires great effort to isolate the ethylbenzene by distillation from a mixture containing these components.

TABLE 1

| | Boiling point (760 mm Hg) |
|---|---|
| Styrene | 145.8 |
| o-xylene | 143.6 |
| m-xylene | 139 |
| p-xylene | 138.4 |
| Ethylbenzene | 136.1 |
| Ethylcyclohexane | 131.8 |
| 4-vinylcyclohexene-1 | 129.5 to 130.5 |

A further disadvantage of dehydrogenation at temperatures above 450°C is that the thermal reverse decomposition of, for example, 4-vinylcyclohexene or 1,5-cyclooctadiene to the monomer (butadiene) already manifests itself in this temperature range.

We have now found that $C_8$-cycloolefins can be converted quantitatively into ethylbenzene by special selection of the process parameters such as pressure, temperature, ratio of hydrogen to $C_8$-cycloolefins and space velocity, and by using particularly active dehydrogenation catalysts. The amounts of impurities remaining in the ethylbenzene obtained are very small and do not interfere with its further conversion into styrene. Hence, expensive distillation and purification operations are not needed in the process according to the invention.

The particular choice of pressure, temperature, space velocity and catalyst ensures that the original high activity of the dehydrogenation catalyst persists on prolonged operation, i.e. for several months. Furthermore, virtually no reverse decomposition of the starting substances to the monomers occurs, and no undesired by-products are formed by cracking or isomerization.

It was surprising and unforeseeable that it would prove possible to eliminate all disadvantages of the known processes by the combination of the present invention and by careful adjustment of the parameters. It would not have been expected that the aromatization reaction of $C_8$-cycloolefins in the presence of dehydrogenation catalysts could be conducted in such a way as to avoid any dehydrogenation in the side chain and that in particular the vinyl group is hydrogenated quantitatively to the ethyl group when dehydrogenating 4-vinylcyclohexene-1.

The present invention therefore relates to a process for the continuous manufacture of ethylbenzene by catalytic dehydrogenation of $C_8$-cycloolefins in the presence of aromatization catalysts and of hydrogen, at superatmospheric pressure and elevated temperature, wherein $C_8$-cycloolefins are converted at temperatures ranging from 350° to 450°C and pressures ranging from 2.5 to 30 atm. abs. in the presence of 0.2 to 20 m³ (S.T.P.) of hydrogen/kg of $C_8$-cycloolefin, by the use of catalysts which contain metals and/or metal oxides of sub-groups VI, VII and VIII of the periodic table, including the platinum metals, the metals and/or metal oxides being present singly or as mixtures.

If the process parameters are suitably chosen, the by-products which result from the process of the invention are merely traces of 4-ethylcyclohexene and small amounts of ethylcyclohexane, the latter depending on the pressure and temperature. To avoid the formation of objectionable amounts of ethylcyclohexane, the reaction should be carried out at hydrogen pressures which are as low as possible. On the other hand, a high pressure of hydrogen is desirable from the point of view of avoiding excessive deposition of carbon on the catalyst.

According to the process of the invention, the pressure is chosen to be just sufficiently high as to prevent coking-up of the catalyst and at the same time sufficiently low that the thermodynamic equilibrium

lies as completely as possible to the side of ethylbenzene.

The process of the invention is carried out at hydrogen pressures of 2.5 to 30 atmospheres, preferably 5 to 12 atmospheres. Under these conditions virtually no deposition of carbon on the catalyst occurs, and the ethylcyclohexane content in the dehydrogenation product can be reduced to less than 2.5 percent by weight.

The choice of the requisite reaction temperature also depends on opposing factors. Temperatures of 360°C are already sufficient to give good yields of ethylbenzene with the dehydrogenation catalysts used according to the invention when working under normal pressure. However, in order to achieve, simultaneously, constant quantitative conversion, a long working life of the catalyst, and high catalyst activity, it is necessary to use higher pressures. The process of the invention is therefore carried out at slightly superatmospheric pressure and in the presence of hydrogen and, in particular, at temperatures ranging from 380° to 420°C. The use of temperatures exceeding 450°C, and especially above 480°C, must be avoided because of the by-products resulting from cracking, which interfere with the further conversion of the ethylbenzene.

The requisite aromatization temperature in the process of the invention also depends on the raw material being dehydrogenated. The raw materials which can be used for the dehydrogenation to ethylbenzene are $C_8$-cycloolefins.

The term $C_8$-cycloolefins is to be understood to include unsubstituted $C_8$-cycloolefins and substituted $C_6$-cycloolefins with a total of 8 carbon atoms and also mixtures of these unsubstituted $C_8$-cycloolefins and substituted $C_6$-cycloolefins, with a total of 8 carbon atoms, with one another; such mixtures are obtained from some processes of manufacture of $C_8$-cycloolefins. $C_8$-cycloolefins possessing a 6-membered ring and a side chain of 2 carbon atoms are preferred. The following may be mentioned in particular: the isomeric ethylcyclohexenes (4-ethylcyclohexene-1, 3-ethylcyclohexene-1 and 2-ethylcyclohexene-1), the isomeric ethylcyclohexadienes such as, for example, 5-ethylcyclohexadiene-1,3, 5-ethylcyclohexadiene-1,4 and 3-ethylcyclohexadiene-1,4, the isomeric vinylcyclohexenes such as, for example, 4-vinylcyclohexene-1, 3-vinylcyclohexene-1 and 1-vinylcyclohexene-1, and the ethylidene-substituted cyclohexenes, such as 4-ethylidenecyclohexene-1 and 3-ethylidenecyclohexene-1. Mixtures of 2 or more $C_8$-cycloolefins (including for example dimethylcyclohexenes) and unsubstituted cycloolefins with 8 carbon atoms, for example cyclooctadienes are also suitable raw materials for the process of the invention. It is also possible for unsubstituted cycloolefins to become converted by isomerization under the reaction conditions into the substituted cycloolefins mentioned above, which then undergo dehydrogenation to ethylbenzene. Because of this isomerization reaction which precedes the actual reaction, unsubstituted $C_8$-cycloolefins or dimethyl-substituted $C_6$-cycloolefins give somewhat lower yields than $C_8$-cycloolefins which contain a 6-membered ring with a side chain of 2 carbon atoms. The process of the invention is preferably carried out with 4-vinylcyclohexene-1 and 4-ethylcyclohexene-1.

The dwell time in the presence of the aromatization catalyst of the compound to be dehydrogenated is determined by the space velocity, expressed in parts by volume of liquid starting material per hour per part by volume of catalyst. In the process of the invention, space velocities ranging from 0.5 l per l of catalyst and per hour to 10 l per l of catalyst per hour are employed. In a preferred embodiment of the process, volume throughputs ranging from 1 to 5 l per l of catalyst per hour are used.

The form of presentation of the catalyst is not a determining factor in the process. Preferably, fixed bed catalysts are used in the process according to the invention. However, the dehydrogenation according to the invention can also be carried out in a moving bed or fluidized bed. In a preferred embodiment of the process, the olefin to be dehydrogenated is mixed with hydrogen (which may have been recycled) and the mixture is heated to the reaction temperature and passed under superatmospheric pressure over the catalyst. After cooling, the liquid reaction products are separated from the gaseous constituents in a pressure separator. Some of the gas can be recycled to the reactor; excess hydrogen is withdrawn from the system. A distinctive feature of the process of the invention is that practically pure ethylbenzene results, which can be dehydrogenated to styrene direct, without additional purification by distillation of other methods, and using known processes for the conversion to styrene.

Suitable catalysts for carrying out the process are metals and/or metal oxides of sub-groups VI, VII and VIII of the periodic table, including the platinum metals. Mixtures of the said metals with one another or with the said metal oxides have also proved to be suitable catalysts. Platinum catalysts, or catalysts containing platinum and rhenium or cobalt and molybdenum oxide are preferred for the process according to the invention.

It is advantageous to support the catalysts on suitable porous materials. Silica gel, kieselguhr, asbestos, graphite and active charcoal may be mentioned as supports. Aluminum oxides, in particular $\gamma$-aluminum oxide, has proved to be a particularly suitable support.

When using certain raw materials it can be of advantage to add small amounts of alkali metal oxides or alkaline earth metal oxides to the actual dehydrogenation catalyst for the purpose of avoiding isomerization reactions.

A preferred catalyst in general contains 0.05 to 5 percent by weight, especially 0.1 to 2 percent by weight, of platinum, rhenium or palladium or similar amounts of a mixture of these metals on $\gamma$-aluminum oxide. If catalysts based on oxides or metals of elements of sub-groups VI to VIII are used, higher proportions of the active components are employed. The preferred catalyst from this range is cobalt-molybdenum oxide containing 2 to 7% of Co and 12 to 16% of molybdenum, calculated as oxide, on $\gamma$-aluminum oxide as the support. A hydrogen to cycloolefin ratio of 0.5 to 20 m$^3$ (S.T.P.) per kg of cycloolefin employed is preferably used in order to achieve an adequate life of the catalyst; the preferred ratios are 1.5 to 15 m$^3$ (S.T.P.) per kg of cycloolefin.

The data listed in Table 2 show the superiority of the process of the invention over the prior art (namely the normal pressure process of Komarewsky et al. and the processes at higher temperatures according to U.S. Pat. Nos. 2,376,985 and 2,438,041).

TABLE 2

| Reference | Process | Raw material | Conversion [%] | End products | |
|---|---|---|---|---|---|
| V.I. Komarewsky et al | Process under normal pressure at 400–500° in the presence of hydrogen | Vinylcyclohexene | Max. 75 | Ethylbenzene, Styrene, | max. 71% conversion max. 4% conversion |
| U.S. Patent 2,376,985 | 0.2–2 atmospheres total pressure, 450–800° (especially 500–600°), max. 1 m$^3$ of H$_2$/kg of VCH | Butadiene, Vinylcyclohexene | Partial conversion | Ethylbenzene Styrene Vinylcyclohexene | No data on conversion or yield |
| U.S. Patent 2,438,041 | High temperature process at 400–600° (for example 515–525°) and 1.4 atmospheres total pressure) | Butadiene 42.7% Vinylcyclohexene 33.3% Nitrogen 25% | Partial conversion | Styrene Ethylbenzene Vinylcyclohexene Butadiene | No data on conversion or yield |
| The present invention | Process under pressure, pref. 380–420°, pref. at 5–12 atms. H$_2$ : VCH = 1.5–15 Nm$^3$/kg | Vinylcyclohexene | 100% | Ethylbenzene Styrene Remainder * Unidentified products + decomposition products | >90% conversion <0.1% conversion <8% conversion <2% conversion |

* Benzene, toluene, xylenes, ethylcyclohexane and ethylcyclohexene

| Notes | | |
|---|---|---|
| | Is isolation and purification by distillative separation from unconverted starting product and from by-products necessary: | |
| No data on carbon deposition on the catalyst | Yes | |
| Ethylbenzene is withdrawn and recycled to the dehydrogenation step | Yes | |
| — | Yes | |
| Practically no carbon deposit on the catalyst | No | |

The process of the invention is explained in more detail in the examples which follow.

EXAMPLE 1

4-vinylcyclohexene-1 and hydrogen (2 m$^3$(S.T.P.)/kg of vinylcyclohexene) are passed, at a space velocity of 1.2 l/l. hr based on liquid vinylcyclohexene, over a cobalt-molybdenum catalyst (5 percent by weight of CoO and 13.5 percent by weight of MoO$_3$ on $\gamma$-Al$_2$O$_3$) at 420°C. The pressure in the reactor is 8 atmospheres gauge.

The conversion of vinylcyclohexene remains quantitative for more than 100 hours. The thermal reverse decomposition of 4-vinylcyclohexene-1 and the formation of gaseous hydrocarbons by cracking of the reaction products amounts to less than 2% (based on 4- vinylcyclohexene-1 employed). After operating for 100 hours (without intermediate regeneration) the catalyst was still fully active and the dehydrogenation product obtained had the following composition:

| | | |
|---|---|---|
| Ethylbenzene | 90.5 | percent by weight |
| Styrene | <0.1 | " |
| o-xylene | 0.7 | " |
| m/p-xylene | 0.2 | " |
| Toluene | 1.0 | " |
| Benzene | 2.5 | " |
| Ethylcyclohexene | 0.3 | " |
| Ethylcyclohexane | 2.4 | " |
| Vinylcyclohexene | 0.0 | " |
| Cracked products ($C_5$- and $C_6$-hydrocarbons) | 2.0 | " |
| Unidentified material | 0.3 | " |

EXAMPLE 2

4-vinylcyclohexene-1 and hydrogen (6 Nm³/kg of vinylcyclohexene) are passed at a space velocity of 2.5 l/l. hr, based on liquid vinylcyclohexene, over a catalyst at 390° to 400°C. The catalyst contains 0.6 percent by weight of platinum on $\gamma$-$Al_2O_3$. The pressure in the reactor is 8 atm. abs. After operating for more than 500 hours without intermediate regeneration, the vinylcyclohexene conversion still remained quantitative and the catalyst still retained its full initial activity. The thermal reverse decomposition of the 4-vinylcyclohexene-1 and formation of gaseous hydrocarbonx by cracking of the reaction products amounts to less than 0.5% (based on 4-vinylcyclohexene-1 employed).

After operating for 300 hours, the dehydrogenation product had the following composition:

| | | |
|---|---|---|
| Ethylbenzene | 96.60 | percent by weight |
| Styrene | <0.005 | " |
| o/m/p-xylene | 0.35 | " |
| Toluene | 0.65 | " |
| Benzene | 0.90 | " |
| Ethylcyclohexene | <0.005 | " |
| Ethylcyclohexane | 1.30 | " |
| Remainder (cracked products $C_5$- and $C_6$-hydrocarbons + unidentified material) | 0.20 | " |

EXAMPLE 3

If the procedure described in Example 2 is followed but at 400° to 410°C and a pressure of 6 atmospheres gauge, using a catalyst which contains 0.1 percent by weight of Pt and 0.4 percent by weight of Re on $\gamma$-$Al_2O_3$, the dehydrogenation product after 120 hours has virtually the same composition as that shown in Example 2. During this period, the conversion of 4-vinylcyclohexene-1 is quantitative and after 120 hours the catalyst still retains its full activity.

We claim:

1. A process for the continuous manufacture of ethylbenzene by catalytic dehydrogenation of cycloolefins of 8 C atoms in the presence of aromatization catalysts and of hydrogen, at superatmospheric pressure and elevated temperature, wherein $C_8$-cycloolefins are converted at temperatures ranging from 350° to 450°C and pressures ranging from 2.5 to 30 atmospheres gauge, in the presence of 0.2 to 20 m³ (S.T.P.) of hydrogen/kg of $C_8$-cycloolefin, by the use of catalysts which contain metals and/or metal oxides of subgroups VI, VII and VIII of the periodic table, including the platinum metals, the metals and/or metal oxides being present singly or as mixtures.

2. A process as claimed in claim 1, wherein pressures ranging from 5 to 12 atmospheres gauge are used.

3. A process as claimed in claim 1, wherein the conversion is carried out in the presence of 1.5 to 15 m³ (S.T.P.) of hydrogen/kg of $C_8$-cycloolefin.

4. A process as claimed in claim 1, wherein the catalyst used contains 0.1 to 1.5 percent by weight of platinum on $\gamma$-aluminum oxide as the support.

5. A process as claimed in claim 1, wherein 4-vinylcyclohexene-1 is converted at temperatures ranging from 380° to 420°C and pressures ranging from 5 to 12 atmospheres gauge, in the presence of 1.5 to 15 m³ (S.T.P.) of hydrogen/kg of vinylcyclohexene, using a catalyst which contains 0.1 to 2 percent by weight of platinum on a $\gamma$-aluminum oxide support.

6. A process as claimed in claim 1 wherein the ethylcyclohexane content of the resultant dehydrogenation product is less than 2.5% by weight.

7. A process as claimed in claim 1 wherein said cycloolefin of 8 C atoms is 4-vinylcyclohexene-1 or 4-ethylcyclohexene-1.

8. A process as claimed in claim 7 wherein the ethylcyclohexane content of the resultant dehydrogenation product is less than 2.5% by weight.

9. A process as claimed in claim 1 wherein the specific velocity in the dehydrogenation zone is in the range of 0.5 to 10 liters, expressed as parts by volume of liquid starting material, per liter of catalyst per hour.

10. A process as claimed in claim 1 wherein said catalyst is cobalt oxide and molybdenum oxide on $\gamma$-aluminum oxide as the support.

* * * * *